(12) United States Patent
Gonzaga

(10) Patent No.: US 10,828,948 B2
(45) Date of Patent: Nov. 10, 2020

(54) GROUP FOR SUPPORTING AND TIGHTENING A RIM OF OR FOR A TIRED WHEEL

(71) Applicant: Butler Engineering and Marketing S.p.A., Rolo (Reggio Emilia) (IT)

(72) Inventor: Tullio Gonzaga, Correggio (IT)

(73) Assignee: BUTLER ENGINEERING AND MARKETING S.P.A., Rolo (Reggio Emilia) (IT)

(*) Notice: Subject to any disclaimer, the term of this patent is extended or adjusted under 35 U.S.C. 154(b) by 202 days.

(21) Appl. No.: 15/888,488

(22) Filed: Feb. 5, 2018

(65) Prior Publication Data
US 2018/0222261 A1 Aug. 9, 2018

(30) Foreign Application Priority Data
Feb. 7, 2017 (IT) .......................... 102017000013294

(51) Int. Cl.
| B60C 25/05 | (2006.01) |
| B60C 25/00 | (2006.01) |
| B60C 25/13 | (2006.01) |
| B60B 30/08 | (2006.01) |
| B60C 25/132 | (2006.01) |

(52) U.S. Cl.
CPC .......... *B60C 25/0536* (2013.01); *B60B 30/08* (2013.01); *B60C 25/00* (2013.01); *B60C 25/0542* (2013.01); *B60C 25/0545* (2013.01); *B60C 25/132* (2013.01); *B60B 2900/111* (2013.01); *B60B 2900/115* (2013.01); *B60B 2900/531* (2013.01); *B60C 25/0521* (2013.01); *B60C 25/0527* (2013.01); *B60C 25/0539* (2013.01)

(58) Field of Classification Search
CPC ............ B60C 25/0536; B60C 25/0539; B60C 25/0542; B60C 25/0545; B60C 25/00; B60C 25/132; B60C 25/0527; B60C 25/0521; B60C 25/138; B60B 30/08; B60B 2900/115; B60B 2900/111; B60B 2900/531

See application file for complete search history.

(56) References Cited

U.S. PATENT DOCUMENTS

| 3,099,300 | A | * | 7/1963 | Breazeale | ........... B60C 25/0542 |
| | | | | | 157/14 |
| 5,074,347 | A | * | 12/1991 | Corghi | .................. B60B 25/002 |
| | | | | | 157/14 |
| 9,283,820 | B1 | * | 3/2016 | Hanneken | ............. B60C 25/138 |

FOREIGN PATENT DOCUMENTS

| EP | 1048496 | 11/2000 |
| EP | 1612064 | 1/2006 |
| EP | 3098092 | 11/2016 |

OTHER PUBLICATIONS

Search Report for IT 201700013294 dated Sep. 25, 2017 (8 pages).

* cited by examiner

*Primary Examiner* — Bayan Salone
(74) *Attorney, Agent, or Firm* — Tutunjian & Bitetto, P.C.

(57) ABSTRACT

The present invention regards a group for supporting and tightening a rim of or for a tired wheel, and such group includes a base, a wheel-holder table, an upright or column projecting upward from the base and supporting at the top the wheel-holder table, a shaft or pin mounted in or alongside the upright or column, a sleeve element or ring nut element constrainable or mountable on the shaft or pin and means for the relative movement of the shaft or pin and of the table.

23 Claims, 5 Drawing Sheets

GROUP FOR SUPPORTING AND TIGHTENING A RIM OF OR FOR A TIRED WHEEL

TECHNICAL FIELD OF THE INVENTION

The present invention regards a group for supporting and tightening a rim of or for a tired wheel as well as a method for tightening a rim.

STATE OF THE PRIOR ART

Usually, in order to lock a wheel on a platform of a tire mounting-demounting machine, one uses a pin which is inserted in a hole of the platform itself, and such pin is associated with a locking ring nut.

As will be understood, the pin with the ring nut currently used is heavy as well as inconvenient to use.

U.S. Pat. No. 5,074,347A, EP1612064A1 and EP3098092A1 teach solutions according to the state of the prior art.

SUMMARY OF THE INVENTION

One object of the present invention is to provide a new group for supporting and tightening a rim of or for a tired wheel.

Another object of the present invention is to provide a new group as stated above, which is light.

Another object of the present invention is to provide a new group for supporting and tightening a rim which is simple to use.

Another object of the present invention is to provide a new method for supporting and tightening a rim of or for a tired wheel.

In accordance with one aspect of the invention, a group is provided according to the present application.

The present application refers to preferred and advantageous embodiments of the invention.

BRIEF DESCRIPTION OF THE DRAWINGS

Other characteristics and advantages of the invention will be clearer from the description of embodiments of a group, illustrated as an example in the enclosed drawings in which.

In the drawing set, equivalent parts or components are marked with the same reference numbers.

DETAILED DESCRIPTION OF THE INVENTION

Figure 1:
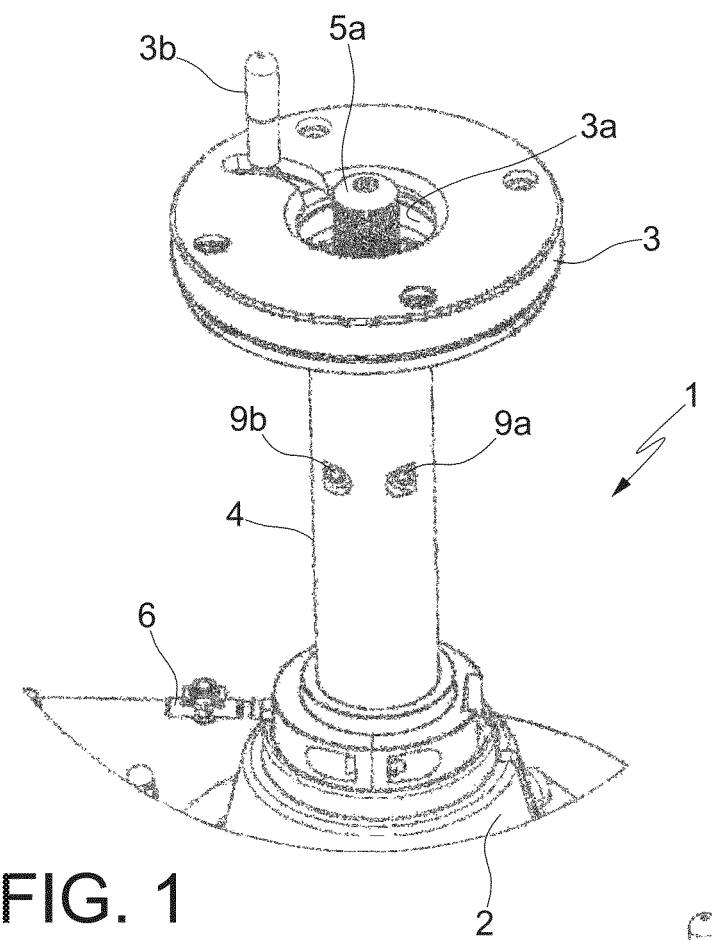
FIGS. 1 and 2 are slightly top perspective views of a group according to the present invention without sleeve element or ring nut element and with pin, respectively, in the relative first work position and in the relative second rest position.
Figure 2:
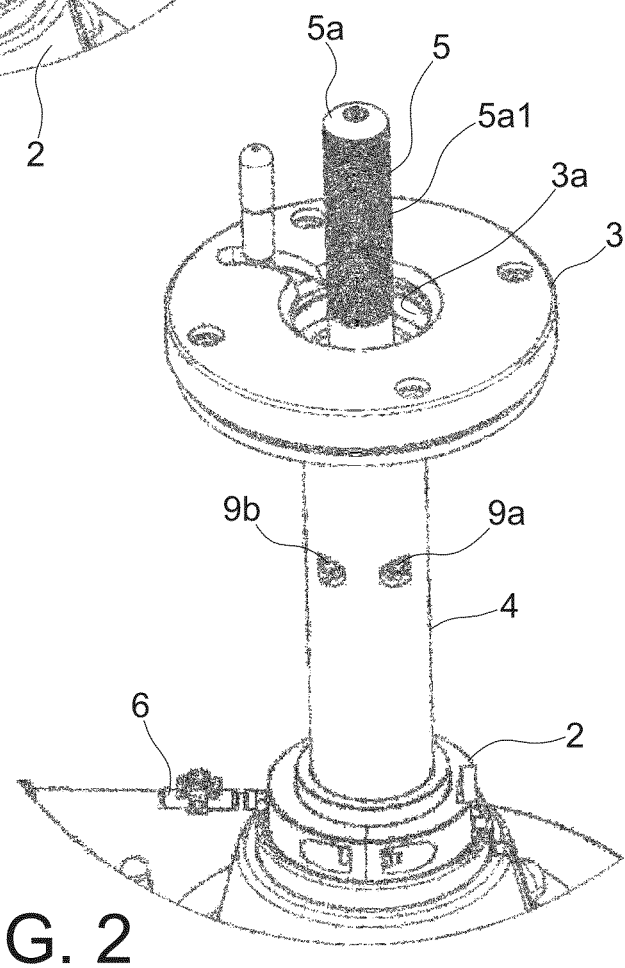
Figure 3:
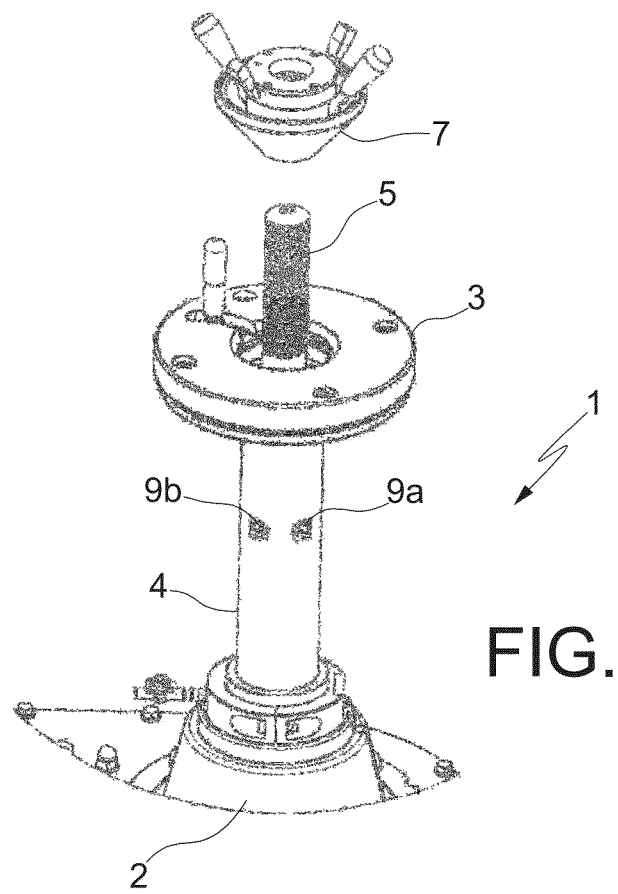
FIG. 3 is a slightly top perspective view of the group of FIG. 1 with sleeve element or ring nut element.
Figure 4:
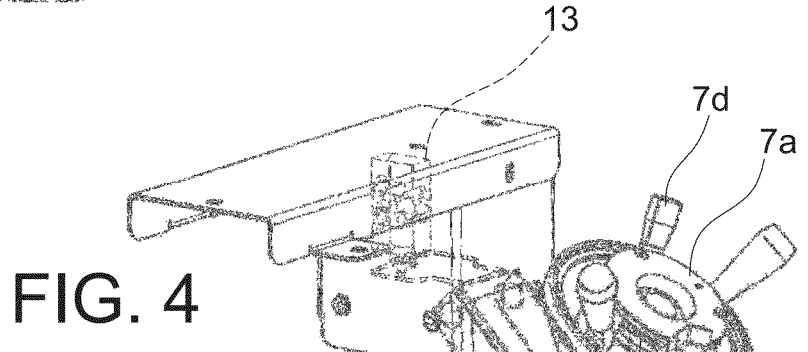
FIGS. 4 and 5 are schematic views of a support component for a group according to the present invention with sleeve element or ring nut element abutted thereon or not abutted thereon.

With reference to FIGS. 1 to 10, a group 1 is illustrated for supporting and tightening a rim W of or for a tired wheel TW, in particular a group of or associable with a machine for handling tired wheels, such as a tire mounting-demounting machine; such group 1 comprises a base 2, a wheel-holder table or rim-holder table 3 as well as a column or upright, e.g. hollow 4, projecting upward from the base 2 and supporting at the top the wheel-holder table 3.

The wheel-holder table 3 advantageously comprises a component or a group of components that are annular and stacked, delimiting a through axial opening or hole 3a, substantially aligned with the longitudinal cavity 4a delimited by the upright 4.

The upright 4 can be extended around a longitudinal axis x-x, which preferably constitutes the symmetry axis of the upright 4 and of the longitudinal cavity 4a.

If desired, the table 3 can also have a reference element for the positioning of a rim W, such as a rod-like or stem-like element 3b set to be inserted in a hole delimited by the rim W, e.g. a hole for positioning a respective bolt, when the rim W is mounted on a vehicle.

The table 3 can for example be as described in the European patent EP1724125B1 or U.S. Pat. No. 6,109,327 or it can be of another type.

In addition, the table 3 can be fixed, e.g. by means of fitting, welding, glue, screws or the like at the top of the upright 4 or be movably or slidably mounted thereon.

The group 1 is then provided with a pin or shaft 5 mounted in or alongside the upright 4, if desired slidably mounted in the hollow upright 4.

The pin or shaft 5 comprises a rod-like or bar-like body and at a first end 5a it can have an externally threaded section 5a1, if desired that which is upper during use and set to exit outward (as will be better explained hereinbelow) with respect to the upright 4 and to the table 3. The other end or the second end 5b, if desired lower, of the pin 5 is preferably always inserted and not extractable (except for disassembly of the group or of components or plugs thereof) from the upright 4.

Provision is also made for means 6 for the relative movement of the pin 5 and of the table 3 between at least one relative first work position, in which the pin 5 projects upward with respect to the wheel-holder table 3 and is engageable by a sleeve element or ring nut element (which will be better described hereinbelow) such that the latter tightens, together with the wheel-holder table 3, a rim W mounted on the latter, and a relative second rest position, in which the pin 5 does not project upward with respect to the wheel-holder table 3 or in any case it projects with respect to the latter to a lesser extent than in the first work position.

Preferably, the relative movement means 6, in particular for bringing pin 5 and the table 3 from the second rest position to the first work position, are set to push the pin 5 upward and/or the table 3 downward.

Clearly, in the relative second rest position, the pin 5 is not engageable by the sleeve element or ring nut element 7.

The relative movement means are, preferably, integrated or set to act in the upright 4 or they are integrated or set to act under the wheel-holder table 3, i.e. the relative movement means are not carried or acting also, or better yet only, outside the upright 4 or on top of the wheel-holder table, for example the relative movement means are not carried by or integral with a sleeve element or ring nut element (which will be better described hereinbelow) constrainable or mountable to/on the pin 5.

On such matter, the relative movement means can comprise means 6 for feeding a fluid, such as air or a liquid, e.g. water or an oil, if desired a pressurized fluid, for example into the upright 4; such feeding means 6 are set to push the pin 5 and/or the table 3 between the first and the second position.

Advantageously, the feeding means 6 comprise a duct or a first conveyance line in fluid communication with a tank or a compressor, a delivery line SO or the like; such conveyance line 6 leads into the axial cavity 4a of the upright 4 in which the pin 5 is slidably mounted, the conveyance line 6 preferably leading to a zone of the axial cavity 4a below the pin 5.

Alternatively, the relative movement means could comprise an actuator—pneumatic, hydraulic, oil-hydraulic or electric—, a mechanical component, such as a kinematic mechanism, a lever or the like, with manual or electronic actuation, if desired by means of button, pedal or remote control.

In addition, the relative movement means could be set to move the pin 5 with respect to the table 3 (solution illustrated in the figures), to move the table 3 with respect to the pin 5 or to move both such components with respect to each other. If the relative movement means were set to move the table 3 with respect to the pin 5, the table 3 could be movably mounted on the upright 4 and movable with respect thereto.

Preferably, in the first work position, the pin 5 projects to an extent equal to or slightly smaller or even greater than the thickness of a rim W to be tightened.

Advantageously, in the second position, the pin 5 is in a position such to not obstruct operations of positioning a rim W on the table 3, e.g. it could be entirely housed or in any case housed for the entire length thereof in the upright 4 and the table 3 or better yet in the axial or longitudinal cavity 4a of the upright 4, or project less than 5 cm, preferably less than 1 or 2 cm with respect to the table 3, where by "project" it is naturally intended projecting outside the upright 4 or above the same and the table 3.

In addition, the group 1 comprises a sleeve element or ring nut element 7, if desired configured as a cone or a hollow truncated cone, constrainable or mountable, such that the sleeve element or ring nut element 7 tightens, together with the wheel-holder table 3, a rim W mounted on the latter.

Preferably, the sleeve element or ring nut element 7 is constrainable or mountable on the pin 5 previously mounted in the upright 4 and (constrainable or mountable) only when the pin 5 and the table 3 are in the or in a relative first work position. More particularly the sleeve element or ring nut element 7 is constrainable or mountable on the first end 5a of the pin 5, and it, preferably, has a threaded internal wall 7b1 (which will be better described in the following) for the mesh engagement with the externally threaded section 5a1 of the pin or shaft 5.

Advantageously, the sleeve element or ring nut element 7 is adjustably constrainable or mountable on the pin 5, so that the sleeve element or ring nut element 7 is displaceable along the pin 5 for tightening together with the wheel-holder table 3 a rim W mounted on the latter. This can be obtained by means mesh engaging sleeve element 7 and pin or by means of an adjustable fitting.

In other words, when the sleeve element or ring nut element 7 is constrained or mounted on the pin 5, the latter is already mounted, preferably slidably, in the upright 4, e.g. in the hollow upright, and additionally the sleeve element or ring nut element 7 is constrained or mounted on the pin 5 after the pin 5 and the table 3 have been brought into the relative first work position.

The sleeve element or ring nut element 7 can comprise a ring nut with quick release, i.e. the sleeve element or ring nut element 7 is structured in a manner such that it can be moved between a first configuration of adjustable constraint/release, in which it can be adjustably constrained with or released from the pin or shaft 5 and a second configuration of quick release/coupling, in which the sleeve element or ring nut element 7 can be released from or constrained with the pin or shaft 5 quickly or with greater rapidity with respect to the first configuration.

More particularly, according to the embodiment illustrated in the figures (see in particular FIG. 7), the sleeve element or ring nut element 7 can comprise a hollow containment component 7a, if desired having a base element 7a1 and a closure element 7a2 connectable with each other, e.g. removably, which between them define a housing seat for a pressure or bush element 7b with an internal wall 7b1 set to engage the pin or shaft 5. The internal wall 7b1 can be threaded for the mesh engagement with the externally threaded section 5a1 of the pin or shaft 5.

The pressure or bush element 7b can be movable or enlargeable, if desired by acting on small levers or pawls 7d or the like, e.g. elastically loaded, between a first adjustable engagement position in which the pressure or bush element 7b or better yet the axial opening delimited thereby is in narrow configuration, and in such position the pressure or bush element 7b is set to adjustably engage the pin 5 e.g. by means of screwing, and an enlarged configuration in which the pressure or bush element 7b is not engageable with the pin 5, since the axial opening delimited thereby has greater section than the external bulk of the pin 5, or better yet than the externally threaded section 5a1 thereof, and in such position the pressure or bush element 7b allows quickly removing or disengaging the sleeve element or ring nut element 7 from the pin 5.

Clearly, the hollow containment component 7a delimits an axial opening with greater section than the external bulk of the pin or shaft 5.

The sleeve element or ring nut element 7 can then be provided with a protection component 7e, e.g. made of plastic, intended to substantially enclose the hollow containment component 7a or better yet the external face of the hollow containment component 7a, so as to prevent the contact of the latter with the rim W and hence prevent ruining the rim W itself during the tightening operations.

The protection component 7e can also be hollow for the passage of the pin 5 therethrough and configured as a solid of revolution around a symmetry axis, during use corresponding with the axis x-x. In addition, the protection component 7e can delimit a basin-like zone for receiving or housing 7e1 the hollow containment component 7a, as well as having an outer wall or face 7e2 substantially shaped as a cone or truncated cone.

Preferably, the group 1 is also provided with means 9a, 9b for limiting the relative movement of the shaft or pin 5 and of the table 3 set to limit the relative travel of the shaft or pin 5 with respect to the table 3 or vice versa.

More particularly, the limitation means 9a, 9b are adapted to engage or block the pin 5 and/or the table 3 when the pin 5 and the table 3 are in the relative first work position and/or in the second rest position.

The containment means can comprise means 9a, 9b for retaining the pin at least for part of its extension inside the upright 4, e.g. hollow.

According to the embodiment illustrated in the figures, the limitation or retention means 9a, 9b comprise at least one or a pair of plugs 9a, 9b fitted, e.g. removably, in the hollow upright 4 and set to be at least partially extended through the longitudinal cavity 4a of the latter, e.g. transverse to the latter or in a direction orthogonal to the axis x-x.

In such case, the pin 5 can be provided or delimits at least one, a pair or multiple recessed zones or slots, so as to define one or more seats 5c, each for housing a respective plug 9a, 9b with sliding of the pin 5 with respect to the table 3 integral with the plug 9a, 9b and/or of the table 3 with respect to the pin 5; such seats 5c can have at least one first abutment shoulder 5c1 for one or more plugs 9a, 9b when the pin 5 is arranged in the first work position with respect to the table 3, and such first abutment shoulder 5c1 constitutes a first end stop set to define the positioning of the pin or shaft 5 with respect to the table 3 or of the table 3 with respect to the pin or shaft 5 in the first position.

The seat/seats 5c can also have at least one second abutment shoulder 5c2 for one or more plugs 9a, 9b when the pin 5 is arranged in the second rest position with respect to the table 3 or when the table 3 is arranged in the second rest position with respect to the pin 5; such second abutment shoulder 5c2 constitutes a second end stop set to define the positioning of the pin or shaft 5 with respect to the table 3 or of the table 3 with respect to the pin or shaft 5 in the second position.

Alternatively, the plug/plugs 9a, 9b could be made of a single piece or fixed in the pin 5 or engaged and projecting from the pin 5, while the recessed slot(s) or zone(s) could be delimited in the upright 4.

According to the non-limiting embodiment illustrated in the figures, the pin or shaft 5 has, from the end 5a engageable by the sleeve 7 to the other end 5b, a first section with greater section, e.g. circular 5d, then a second section 5e with section smaller than the first section 5d so as to delimit, in passing from the first 5d to the second section 5e, one or more first shoulders 5c1, if desired directed downward during use, e.g. an annular shoulder. The second section 5e can have a pair of substantially parallel flat faces 5d1, 5d2, each defining, in particular with the shoulder/s, a respective seat 5c.

If desired, the pin or shaft 5 also has a terminal third section 5f with section greater than the second section 5e so as to delimit, in passing from the second 5e to the third section 5f, one or more second shoulders 5c2, if desired directed upward during use, e.g. an annular shoulder.

The first section 5d and/or the third section 5f can have bulk or external section substantially corresponding to the section of the axial cavity 4a delimited by the hollow upright 4.

The third section 5f can then delimit a groove, e.g. annular, for housing a seal 15.

Alternatively, the first section 5d and the third section 5f could have external section smaller or slightly smaller than the section of the axial cavity 4a delimited by the hollow upright 4 and for example no seal could be provided; in this case, possible fluid delivered by the feeding means 6 could flow between the pin 5 and the internal wall (delimiting the axial cavity 4a) of the hollow upright 4 and of the table 3 so as to maintain the pin 5 clean.

Figure 5:
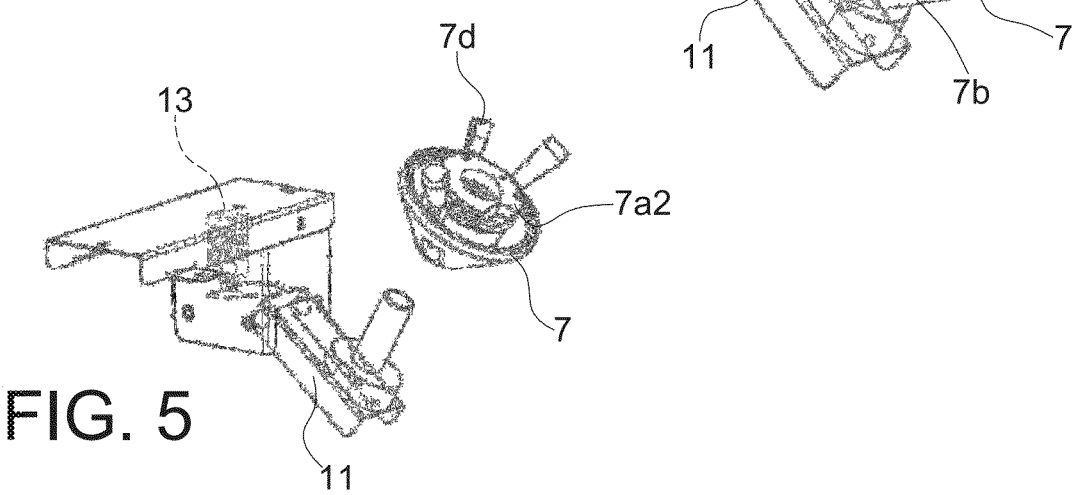
Figure 6:
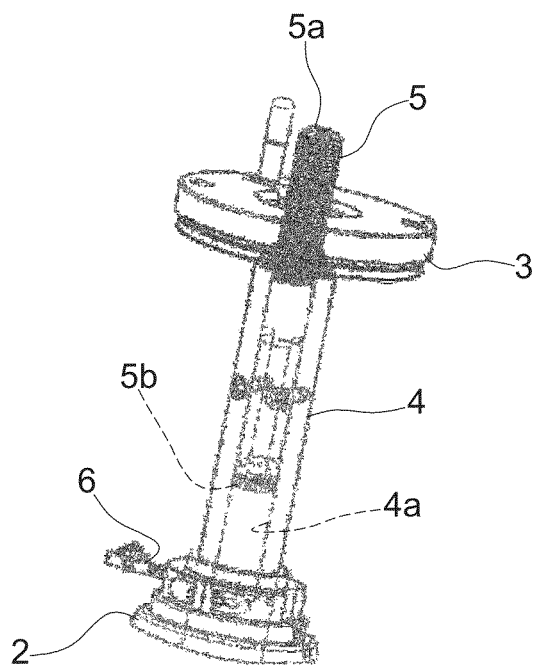
FIG. 6 is a perspective view with transparent parts of the group according to the present invention, without sleeve element or ring nut element.
Figure 7:
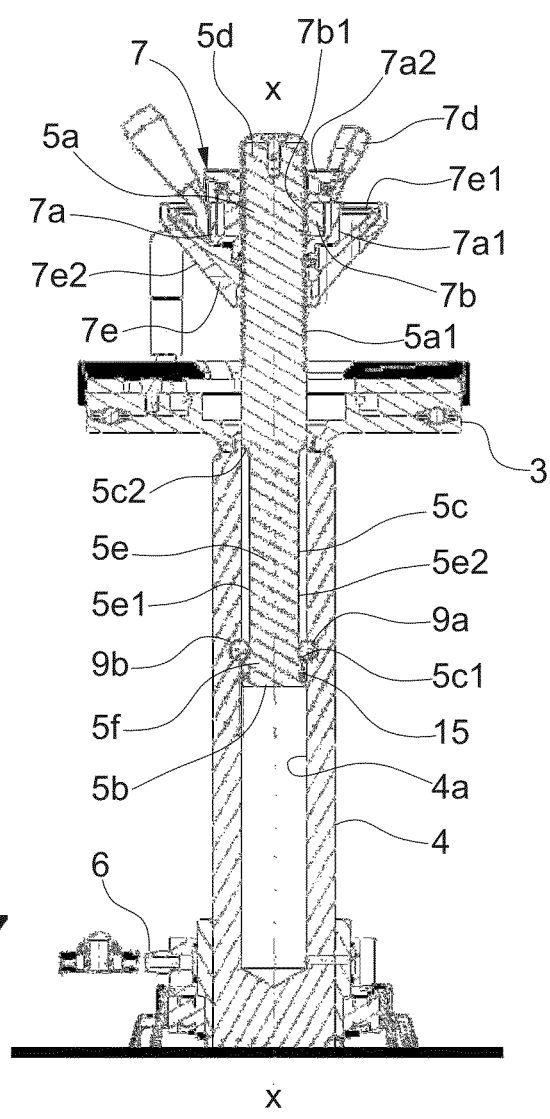
FIG. 7 is a section view of a group according to the present invention.
Figure 8:
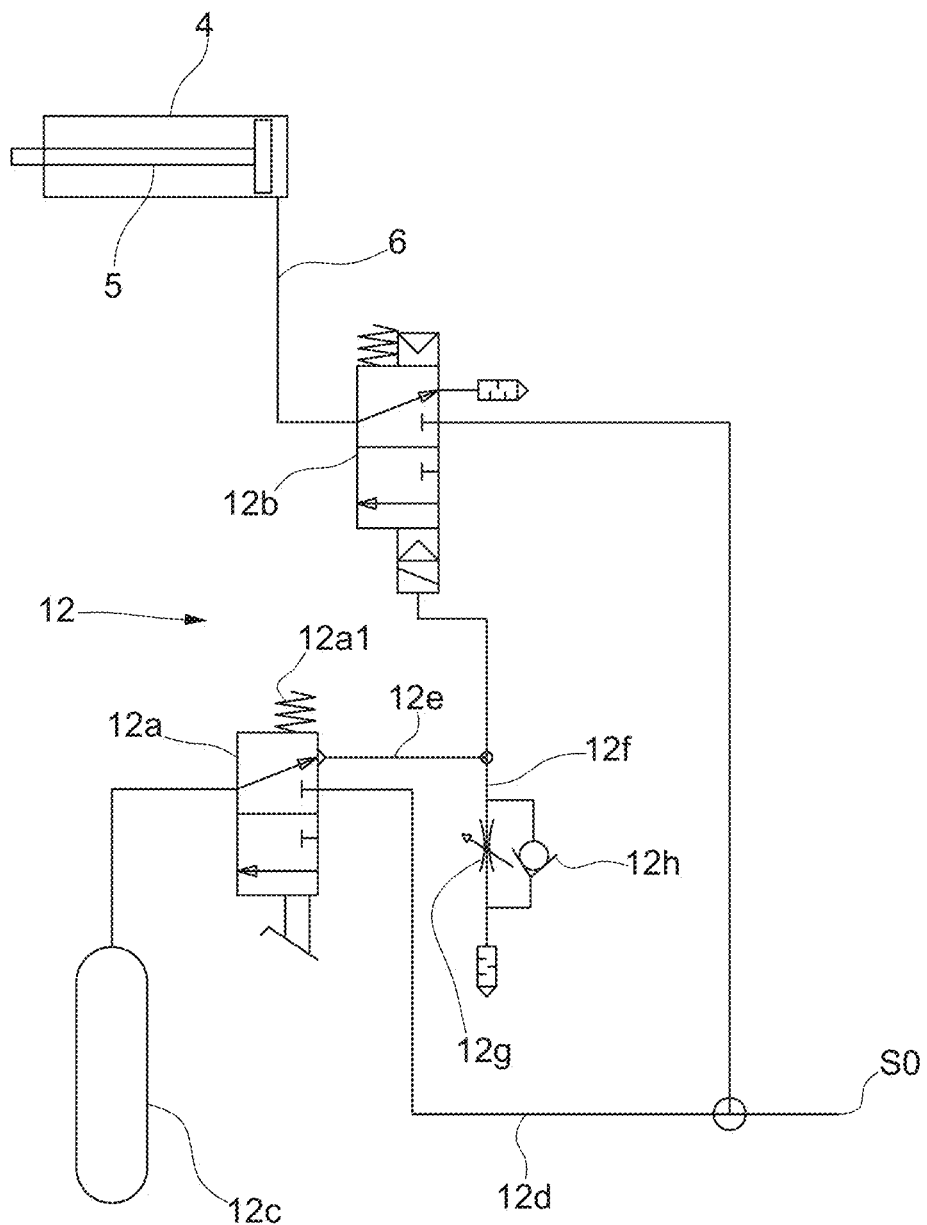
FIG. 8 illustrates a pneumatic circuit for the pressurized fluid feeding in a sleeve of a group according to the present invention.
Figure 9:
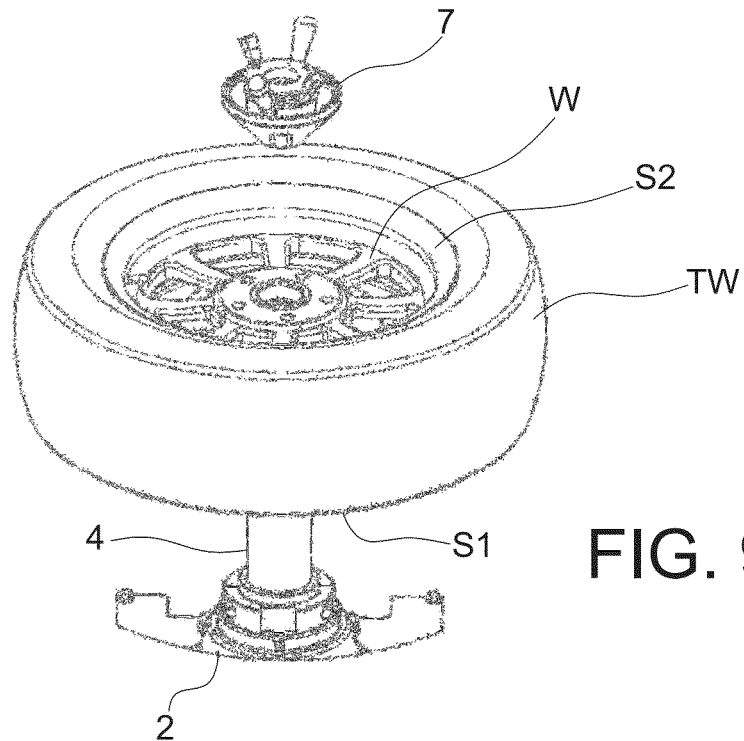
FIGS. 9 and 10 illustrate respective steps of a method according to the present invention.
Figure 10:
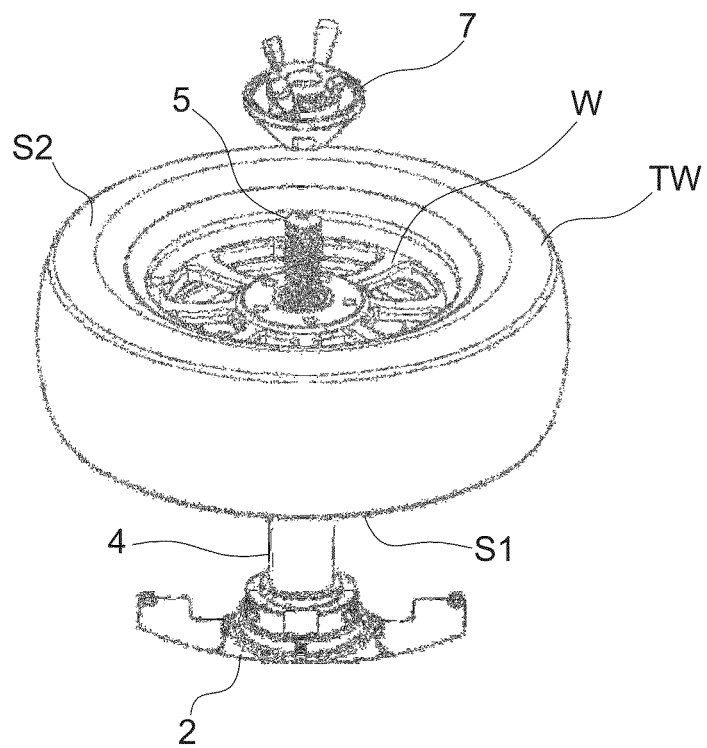

If desired, the group 1 comprises a support component 11, for example connected or constrained to the upright 4 or to the base 2, and in such case the sleeve element or ring nut element 7 is movable between a first rest position on top of or in abutment against the or constrained to the support component 11 (see FIG. 4) and a second work position in which the sleeve element or ring nut element 7 is constrained or mounted on the pin 5 (see FIG. 5).

The group 1 can then comprise a unit 12 for activating the relative movement or feeding means 6, and such unit 12 can comprise a first valve 12a or a first actuator or a similar means that can be switched, for example following stress by an elastic loading element or following movement of a balance element 13 integral or connected with the support component 11, at the time when the sleeve element or ring nut element 7 is picked up from the support component 11 so as to drive or determine the driving of a second valve 12b or of a second actuator or of a similar means of the activation unit 12, in such a manner activating the relative movement means 6.

According to the non-limiting embodiment illustrated in the figures, the activation unit 12 also comprises a tank 12c, as well as a second fluid delivery line 12d, e.g. pressurized, within the tank 12c, if desired intercepted by a valve, for example by the first valve 12a and a third fluid transmission duct or line 12e, e.g. pressurized, to the second valve 12b, if desired it too intercepted by the first valve 12a or by another valve.

The second line 12d and the third line 12e could have a section or duct in common (see the section or duct between the tank 12c and the first valve 12a) or they might not have any section in common.

In such case, the second valve 12b preferably comprises at least one movement end or chamber, while the third line 12e leads to or is in fluid communication with the movement end or chamber and the third line 12e is intended to deliver fluid into such movement end or chamber, so as to stress the second valve 12b and determine the switching thereof from a closure condition of the first line 6 to an open condition thereof.

The second valve 12b can be suitably loaded, for example elastically loaded or in any case stressed. In such case, the third line 12e is intended to deliver fluid into the chamber or towards the movement end, so as to overcome the resistance of the elastic loading element and thus move the second valve 12b.

The first valve 12a can be suitably loaded, for example elastically loaded or in any case stressed. In such case, the first valve 12a can be integral or in any case connected with the support component 11, such that when the sleeve element or ring nut element 7 is picked up, the force of the elastic loading element is no longer balanced, determining a switching of the first valve 12a and thus opening the fluid connection into the third line 12e and hence the fluid passage, for example under pressure, from the tank 12c to the second valve 12b.

The second line can then be provided with a section 12f for discharging, for example into the atmosphere, if desired intercepted by a flow regulator 12g, calibrated or calibratable, e.g. in parallel with a check valve 12h.

Alternatively, the group 1 can comprise a control unit set to detect if the sleeve element or ring nut element 7 is arranged or not on the support component 11 and to drive means for activating the relative movement means or the feeding means 6 when it detects—by means of suitable sensor means—that the sleeve element or ring nut element 7 is not arranged on the or it has been picked up from the or it is not constrained to the support component 11.

Clearly, the group 1 could also lack activation means or a control unit, and in this case it could be the operator to drive the feeding means or the relative movement means each time.

A group according to the present invention, in particular the table or wheel-holder table 3, could be motorized, by means of an electric motor, pneumatic motor or motor of another type, and rotatable so as to be able to drive in rotation a rim or a tired wheel mounted thereon and tightened around a rotation axis, which during use corresponds with the rotation and symmetry axis of the rim W. Alternatively, the table could be fixed, and in this case one or more handling or tire mounting-demounting units or better yet the base thereof could be rotatable or mounted on wheels, such that it would be possible to drive such unit around the rim or wheel mounted on the tightening group or better yet on the table thereof.

In addition, the table 3 could be movable, for example liftable-lowerable and/or horizontally translatable. This could be useful for vertically and/or horizontally moving the table close to or away from work or handling tools for a machine for handling tired wheels, of which the group according to the present invention forms part or which is associated with such group.

Also forming the object of the present patent application is a machine for handling tired wheels or a tire mounting-demounting machine provided with a supporting and tightening group 1 as described above. The machine comprises in such case also one or more work tools or tools for handling tired wheels to be mounted, demounted and/or processed, e.g. tools for mounting tired wheels, tools for demounting tired wheels or bead breaking tools.

Alternatively, the group could be separated from the other tools or better yet not be part of the same machine of the latter, and in this case the group could be supported by a base thereof and, when necessary, associated with or adjacent to handling units or columns equipped with suitable tools, for example as indicated above.

In accordance with the present invention, also a method is provided for supporting and tightening a rim W of or for a tired wheel TW on a wheel-holder table, such method comprising the following steps:
  arranging a group for supporting and tightening a rim W of or for a tired wheel TW as indicated above,
  arranging the pin 5 and the table 3 in the second rest position, in which the pin 5 does not project upward with respect to the wheel-holder table or rim-holder table 3 or in any case it projects with respect to the latter to a lesser extent than in the first work position,
  positioning, for example manually or by means of an automatic loading device, a rim W of or for a tired wheel TW on the support table 3,
  driving the relative movement means 6 so as to move the pin 5 and/or the table 3 until the pin 5 and the table 3 are brought into the first work position, such that the pin 5 is inserted in the axial hole of the rim W starting from one side S1 of the latter, which is the side of the rim W in contact with or proximal to the wheel-holder table 3, until it projects from the opposite side S2 of the rim W with respect to that S1 of insertion, such side S2 being the side of the rim W distal from the wheel-holder table 3,
  with the pin 5 and the table 3 in the first work position, constraining or mounting the sleeve element or ring nut element 7 on the pin 5 such that the sleeve element 7 tightens, together with the table 3, the rim W,
  handling the rim W or the tired wheel TW mounted on the wheel-holder table 3, for example mounting or demounting a tired wheel.

Preferably, the relative movement means 6, for bringing the pin 5 and the table 3 from the second rest position to the first work position, push the pin 5 upward and/or the table 3 downward.

The step of driving the relative movement means 6 can comprise the feeding of a pressurized fluid into the upright 4 so as to push the pin 5 and/or the table 3 between the first and the second position. Such step can be conducted for example with the above-described feeding means 6.

A method according to the present invention can also comprise a step for detecting the positioning or not of the sleeve element or ring nut element 7 on a support component 11 and in such case the step of driving the relative movement means 6 would preferably be conducted only if during the detection step the sleeve element or ring nut element 7 was not on the support component 11.

If an activation unit 12 is provided as described above, when the sleeve element 7 is arranged on the support component 11, the first valve 12a is pressed and determines the filling of the tank 12c, while the third line 12e is always closed by the first valve 12a, such that the second valve 12b is in a position of closure of the first line 6.

When the sleeve element 7 is lifted from the support component 11 in order to place it on the pin 5, the first valve 12a switches, for example because a balance element 13 of the support component 11 is no longer able to oppose the action of an elastic loading element 12a1 of the first valve 12a, such that the third line 12e is opened and the second line 12d is closed, in a manner such that the pressure of the tank 12c drives the second valve 12b, thus opening the first line 6 and thus driving the exit of the pin 5, for example for an adjustable time through the discharge of the tank into the atmosphere.

This time can vary for example from about ten to thirty seconds, so as to allow the locking of the wheel with the sleeve element 7, after which the tank 12c is discharged and the second valve or actuation valve 12b is switched by discharging the third line 12e.

Clearly, after having handled the rim or the tired wheel, the sleeve element or ring nut element 7 is released or demounted from the pin 5 and the relative movement means 6 are driven backwards so as to bring the pin 5 and/or the table 3 into the second rest position or the pin 5 and/or the table 5 are left to automatically return into the second rest position.

On such matter, at the end of the rim W handling operation, e.g. demounting and/or mounting, it is possible to unlock the sleeve element 7, such that the pin 5 returns due to its weight within the hollow upright 4, since the same is no longer supported by the fluid in the cavity 4a of the hollow upright 4 and after one such step, the sleeve element 7 is once again abutted against the support component 11, so as to determine the filling of the tank 12c for a subsequent work cycle.

If the sleeve element or ring nut element 7 comprises a ring nut with quick release movable between a first configuration of adjustable constraint/release and a second configuration of quick release/coupling, then the ring nut with quick release is constrained to the pin or shaft 5 when it is in a first configuration of adjustable constraint, while the ring nut with quick release is released from the pin or shaft 5 when the same is in a second configuration of quick release, such that the release step is conducted with quicker speed than the constraining step.

With a group according to the present invention, the pin or shaft 5 is always inserted in the upright 4 and it is retractable or extractable into/from the same, automatically so to be able to easily position the wheel. A locking element for the operator is still ensured, i.e. the sleeve element that is much lighter than the current solutions, since the same lacks pin or shaft—the latter instead being integrated in the upright.

Modifications and variations of the invention are possible within the protective scope defined by the claims.

The invention claimed is:

1. A group for supporting and tightening a rim of or for a tired wheel, said group comprising:
    a base,
    a wheel-holder table,
    an upright or column projecting upward from said base and supporting at the top said wheel-holder table,
    a shaft or pin mounted in or alongside said upright or column,
    a sleeve element or ring nut element constrainable or mountable on said shaft or pin,
    means for the relative movement of said shaft or pin and said table between
    at least one first relative work position, in which said pin projects upward with respect to said wheel-holder table and is engageable by said sleeve element or ring nut element so that the sleeve element or ring nut element tightens, together with said wheel-holder table, a rim mounted on the wheel-holder table, and
    a second relative rest position, in which said shaft or pin does not project upward with respect to said wheel-holder table or in any case it projects with respect to the wheel-holder table to a lesser extent than in said first work position,
    wherein said sleeve element or ring nut element is constrainable or mountable on said shaft or pin previously mounted in said upright and only when said pin and said table are in said at least one first relative work position
    wherein said shaft or pin comprises a rod-like or bar-like body and at a first end comprises an externally threaded section set to exit outward with respect to said upright and to said table, and wherein said sleeve element or ring nut element comprises a ring nut element, and wherein the ring nut element engages the externally threaded section.

2. The group according to claim 1, comprising limitation means for limiting the relative movement of said shaft or pin and said table set to limit the relative travel of said shaft or pin with respect to said table or vice versa.

3. The group according to claim 2, wherein said limitation means are adapted to engage or block said pin and/or said table when said pin and said table are in the first relative work position and/or in the second rest position.

4. The group according to claim 2, wherein said limitation means comprise means for retaining said pin at least for part of its extension inside said upright.

5. The group according to claim 2, wherein said limitation means comprise at least one or a pair of plugs engaged in the upright and set to be at least partly extended through a longitudinal cavity delimited by the latter or engaged and projecting from said pin, while said pin or said upright is provided with or delimits at least one slot or at least one recessed zone, so as to define at least one seat each for housing a respective plug with sliding of the pin with respect to the table and/or of the table with respect to the pin.

6. The group according to claim 5, wherein said seats have at least one first abutment shoulder of a respective plug when the pin is arranged in the first work position with respect to the table, and such first abutment shoulder constitutes a first end stop set to define the positioning of the pin or shaft with respect to the table or of the table with respect to the pin or shaft when said pin and said table are in said at least one first relative work position.

7. The group according to claim 6, wherein said at least one seat has at least one second abutment shoulder of a respective plug when said pin is arranged in the second rest position with respect to the table or when said table is arranged in the second rest position with respect to the pin, and such second abutment shoulder constitutes a second end stop set to define the positioning of the pin or shaft with respect to the table or of the table with respect to the pin or shaft when said pin and said table are in said second position.

8. The group according to claim 1, wherein said pin is slidably mounted in said upright.

9. The group according to claim 1, wherein said relative movement means are integrated or set to operate in said upright or they are integrated or set to operate under said wheel-holder table.

10. The group according to claim 1, wherein said sleeve element or ring nut element is adjustably constrainable or mountable on said pin, so that said sleeve element or ring nut element is displaceable along said pin for tightening together with said wheel-holder table a rim mounted on the latter.

11. The group according to claim 1, wherein in the second position, the pin is entirely housed or in any case housed for the entire length thereof in the upright and the table or better yet in the axial or longitudinal cavity of the upright, or project less than 5 cm with respect to the table.

12. The group according to claim 1, wherein said relative movement means comprise means for feeding a pressurized fluid set to push said pin and/or said table between said first and said second position.

13. The group according to claim 12, wherein said means for feeding comprise a duct or a first conveyance line in fluid communication with a tank or with a compressor or with a pressurized fluid delivery line, said conveyance line opening into the axial opening of said upright in which said shaft or pin is slidably mounted.

14. The group according to claim 1, comprising a support component and wherein said sleeve element or ring nut element is movable between a first rest position above or in abutment against said support component and a second work position in which said sleeve element or ring nut element is constrained or mounted on said shaft or pin and wherein said group comprises
    a unit for activating said relative movement means, said activation unit comprising a first valve or a first actuator or a similar means switchable at the time when said sleeve element or ring nut element is picked up by said support component so as to drive or determine the driving of a second valve or of a second actuator or of a similar means of said activation unit, thereby activating said relative movement means, or
    a control unit set to detect if said sleeve element or ring nut element is arranged or not on said support component and to drive activation means of said relative movement means when it detects that said sleeve element or ring nut element is not arranged on or it has been picked up by said support component.

15. The group according to claim 1, wherein said sleeve element or ring nut element comprises a ring nut with quick release, i.e. said sleeve element or ring nut element is structured in a manner such to be movable between a first configuration, in which it is adjustably constrainable or releasable with or from said pin or shaft and a second configuration, in which said sleeve element or ring nut element is releasable from or constrainable with said pin or shaft with increased rapidity with respect to said first configuration.

16. A method for supporting and tightening a rim of or for a tired wheel on a wheel-holder table, said method comprising the following steps:
arranging a group for supporting and tightening a rim of or for a tired wheel, said group comprising a base, a wheel-holder table, an upright or column projecting upward from said base and supporting at the top said wheel-holder table, a shaft or pin mounted in or alongside said upright or column, a sleeve element or ring nut element constrainable or mountable on said shaft or pin, means for the relative movement of said shaft or pin and said table between at least one first relative work position, in which said pin projects upward with respect to said wheel-holder table and is engageable by said sleeve element or ring nut element so that the sleeve element or ring nut element tightens, together with said wheel-holder table, a rim mounted on the wheel-holder table, and a second relative rest position, in which said shaft or pin does not project upward with respect to said wheel-holder table or in any case it projects with respect to the wheel-holder table to a lesser extent than in said first work position, said sleeve element or ring nut element being constrainable or mountable on said shaft or pin previously mounted in said upright and only when said pin and said table are in said at least one first relative work position,
arranging said pin and said table in said second rest position, wherein said pin does not project upward with respect to said wheel-holder table or in any case it projects with respect to the wheel-holder table to a lesser extent than in said first work position,
positioning a rim of or for a tired wheel on said wheel-holder table,
driving said relative movement means so as to move said pin and/or said table until said pin and said table are brought into said first work position, so that said pin is inserted in an axial hole of said rim starting from one side of the rim until it projects from the opposite side of said rim with respect to that of insertion,
with said pin and said table in said first work position, constraining or mounting said sleeve element or ring nut element on said pin so that said sleeve element tightens, together with said wheel-holder table, said rim,
handling said rim or tired wheel mounted on said wheel-holder table.

17. The method according to claim 16, wherein said group is according to claim 1.

18. The method according to claim 16, wherein said step of driving said relative movement means comprises the feeding of a pressurized fluid into said upright so as to push said pin and/or said table between said first and said second position.

19. The method according to claim 16, comprising the step of detecting the positioning, or non-positioning, of said sleeve element or ring nut element on or constrained to a support component and wherein the step of driving said relative movement means is only conducted if, during said detection step, said sleeve element or ring nut element is not on or is not constrained to said support component.

20. The method according to claim 16, wherein after having handled said rim or said tired wheel, said sleeve element or ring nut element is released or dismounted from said pin and said relative movement means are controlled backwards so as to bring said pin and/or said table into said second rest position or said pin and/or said table are left to automatically return into said second rest position.

21. The method according to claim 20, wherein said sleeve element or ring nut element comprises a ring nut with quick release movable between a first configuration of adjustable constraint/release and a second configuration of quick release/coupling, and wherein said ring nut with quick release is constrained to said pin or shaft when it is in a first adjustable constraint configuration, while said ring nut with quick release is released from said pin or shaft when it is in a second quick release configuration, so that the releasing step is conducted with greater speed than the constraining step.

22. A group for supporting and tightening a rim of or for a tired wheel, said group comprising:
a base,
a wheel-holder table,
an upright or column projecting upward from said base and supporting at the top said wheel-holder table,
a shaft or pin mounted in or alongside said upright or column,
a sleeve element or ring nut element constrainable or mountable on said shaft or pin,
means for the relative movement of said shaft or pin and said table between
at least one first relative work position, in which said pin projects upward with respect to said wheel-holder table and is engageable by said sleeve element or ring nut element so that the sleeve element or ring nut element tightens, together with said wheel-holder table, a rim mounted on the wheel-holder table, and
a second relative rest position, in which said shaft or pin does not project upward with respect to said wheel-holder table or in any case it projects with respect to the wheel-holder table to a lesser extent than in said first work position,
wherein said sleeve element or ring nut element is constrainable or mountable on said shaft or pin previously mounted in said upright and only when said pin and said table are in said at least one first relative work position,
wherein in the second relative rest position, the pin is housed thereof in the upright and the table, or in the axial or longitudinal cavity of the upright, so as to project less than 5 cm with respect to the table.

23. The group of claim 22, wherein in the second relative rest position, the pin is entirely housed or housed for the entire length thereof in the upright and the table or in the axial or longitudinal cavity of the upright, or projects less than 1 or 2 cm with respect to the table.

\* \* \* \* \*